United States Patent [19]

Kiji

[11] Patent Number: 5,485,415
[45] Date of Patent: Jan. 16, 1996

[54] DIGITAL INTEGRATING CIRCUIT DEVICE

[75] Inventor: Akio Kiji, Hyogo, Japan

[73] Assignee: Mitsubishi Denki Kabushiki Kaisha, Tokyo, Japan

[21] Appl. No.: 230,361

[22] Filed: Apr. 20, 1994

[30] Foreign Application Priority Data

May 7, 1993 [JP] Japan .................. 5-131285

[51] Int. Cl.⁶ .................................................. G06F 7/50
[52] U.S. Cl. ........................................ 364/786; 364/733
[58] Field of Search ................................. 364/786, 733

[56] References Cited

U.S. PATENT DOCUMENTS

| | | | |
|---|---|---|---|
| 4,229,802 | 10/1980 | Eggermont | 364/786 |
| 4,692,890 | 8/1987 | Arseneau | 364/733 |
| 5,134,579 | 7/1992 | Oki et al. | 364/786 |
| 5,189,635 | 2/1993 | Ohki | 364/786 |
| 5,327,368 | 7/1994 | Eustace et al. | 364/786 |

Primary Examiner—David H. Malzahn
Attorney, Agent, or Firm—Townsend and Townsend Khourie and Crew

[57] ABSTRACT

To provide a digital integrating circuit which can increase speed by preventing the influence of a delay in carry propagation and can obtain an accumulated value for each section at a higher sampling frequency, the carry holding type adder 4 and the carry propagation type adder 7 are combined and a plurality of holding registers 51 to 53 and a plurality of result storage registers 81 to 83 are provided to store the results of additions. A single holding register is effective for each section and these holding registers 51 to 53 are structured as shift registers after completion of accumulation for all the sections so that accumulated data stored in the holding registers are sequentially input into the carry propagation type adder to output final accumulated data for each section.

10 Claims, 12 Drawing Sheets

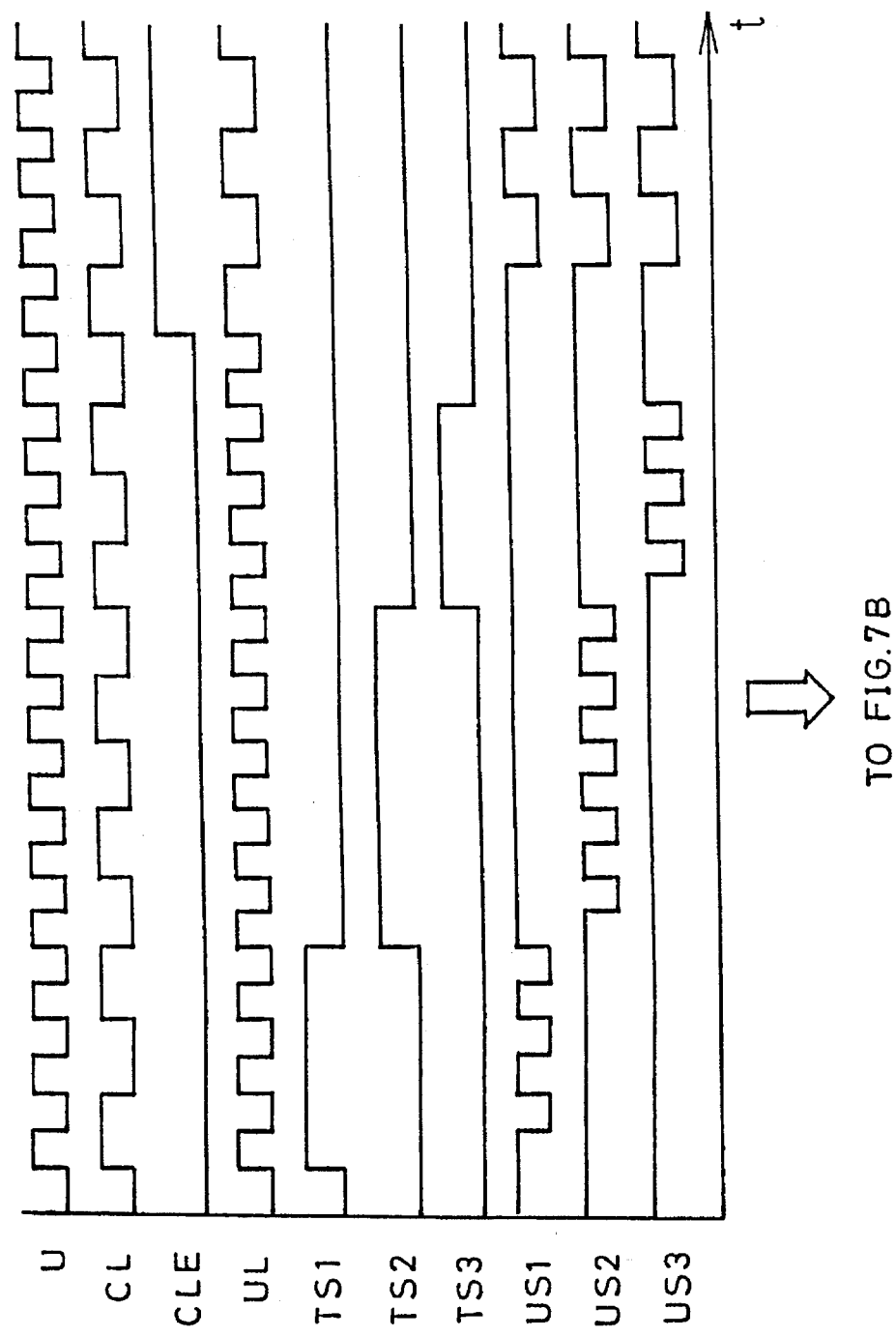

DIGITAL INTEGRATING CIRCUIT DEVICE

BACKGROUND OF THE INVENTION

1. Field of the Invention

The invention relates to a digital integrating circuit device (hereinafter referred to as "digital integrating circuit"), and, more specifically, to a digital integrating circuit for accumulating data at a high speed in camcorders and the like.

2. Description of the Prior Art

FIG. 8 is a structural diagram of a prior art digital integrating circuit. In the figure, designated at 10 to 1n are n+1 (n: an integer of 1 or more) one-bit full adders (FA) corresponding to bits 0 to n of input data. A0 to An and B0 to Bn represent add inputs of the full adders, C0 to Cn carry inputs, S0 to Sn sum outputs, and CY0 to CYn carry outputs. The carry outputs are connected to higher-order carry inputs. Designated at 20 to 2n are D type flip-flops (FF) corresponding to the above-described full adders. I indicates the data input of each of the flip-flops, O data output, C clock input and R reset input. The sum outputs S0 to Sn of the above-described full adders 10 to 1n are input into the data input I of the flip-flops upon a fall in clock signal U and data are output from the data output O of the flip-flops to the add inputs B0 to Bn of the full adders 10 to 1n upon a rise in clock signal U. In the initial state, the data output O of each of the flip-flops 20 to 2n is set at "0" by a reset signal RESET from the outside of the device. Designated at 30 to 3n are latch circuits corresponding to the full adders 10 to 1n. I represents the data input of each of the latch circuits, O data output, and C clock input. During the period when the clock signal U is at high ("H"), the latch circuits supply data input through external input terminals P0 to Pn from the outside of the device directly to the add inputs A0 to An of the full adders 10 to 1n, and, during the period when the clock signal U is at low ("L"), they maintain the previous state.

A description is subsequently given of the operation of the digital integrating circuit. At the start of the operation, data from the data output O of each of the flip-flops 20 to 2n is set at an initial value of "0" by the reset signal RESET. FIG. 9 is a timing chart showing the timing of the digital integrating circuit shown in FIG. 8. Upon a rise in clock signal U, n+1 pieces of data from the respective input terminals P0 to Pn are input into the respective add inputs A0 to An of the full adders 10 to 1n through the respective latch circuits 30 to 3n. Values of the flip-flops 20 to 2n (initially set at "0") are input into the other respective add inputs B0 to Bn of the full adders. At this time, since the carry input C0 of the full adder 10 corresponding to the least significant bit (LSB) is fixed at "0", the sum output S0 and the carry output CY0 of the full adder 10 become definite after a unit delay time Δt. This unit delay time At is required for the input, addition and output of data A0 and B0. The add inputs A1 and B1 of the following full adder 11 are supplied simultaneously with the add inputs A0 and B0 of the above-described full adder 10. However, since the carry input C1 of the full adder 11 also becomes definite after a delay time of Δt, the outputs S1 and CY1 of the full adder 11 become definite after a delay time of 2Δt. In consequence, the outputs Sn and SYn of the full adder in corresponding to the most significant bit (MSB) of the digital integrating circuit shown in FIG. 8 are delayed by (n+1)×Δt.

It is necessary to divide the screen into some sections and to obtain an integral value of a luminance signal for each section of an image obtained from each scanning in order to effect auto-focusing and auto-exposure in an imaging device such as a camcorder. FIG. 10 shows the scanning of the sectioned screen, and solid lines indicate scanning lines and broken lines indicate horizontal retrace lines. In FIG. 10, the screen to be scanned is divided into three sections I, II and III to obtain an integral value between the vertical retrace lines of each section (for one frame). The actual state of the signal is such as shown in FIG. 11 (since waveforms corresponding to scanning lines between scanning lines 2 and 3 and between scanning lines 3 and 4 are the same as the previous ones, they are omitted). To integrate the signal, it is necessary to perform the following. The scanning line 3 of FIG. 10 has virtually the waveform 3 in FIG. 11 and consists of five parts corresponding to sections I, II, III, II and I. FIG. 12 is an enlarged diagram of this waveform. As shown in FIG. 13, actual integration is effected by sampling waveforms at time intervals of ΔT, carrying out A/D conversion at time intervals of ΔT, and inputting the thus obtained digital values to the external input terminals P0 to Pn of the digital integrating circuit shown in FIG. 8. FIG. 12 and FIG. 13 indicate the following. Analog values obtained at time intervals of ΔT, that is, values in the direction of height (the direction h of the vertical axis), are converted into (n+1)-bit binaries which are then input into the external input terminals P0 to Pn. In other words, this A/D conversion is performed at time intervals of ΔT in the direction t of the horizontal axis, heights obtained at time intervals of ΔT are converted into (n+1)-bit binaries, and the binaries are then input into P0 to Pn at time intervals of ΔT. Data to be converted is (n+1)-bit data and digital values obtained by A/D conversion at time intervals of ΔT are binaries whose least significant bit (LSB) is input into the external input terminal P0 and whose most significant bit (MSB) is input into the external input terminal Pn. In this manner, values obtained by A/D conversion at time intervals of ΔT are input into the external input terminals P0 to Pn, and their accumulated values are stored in the flip-flops 20 to 2n by the above-described operation principle. However, since it is necessary to obtain an accumulated value for each of the sections I, II and III, three integrating circuits shown in FIG. 8 must be prepared to calculate and accumulate values for these sections. This process is performed for each scanning line to obtain accumulated values for the sections I, II and III between vertical retrace lines. Upon completion of accumulation, that is, within the vertical retrace line section, a value of the output O of each of the flip-flops 20 to 2n shown in FIG. 8, that is, a (n+1)-bit binary, is used as the final data to be displayed externally. Values at time intervals of ΔT shown in FIG. 13 are obtained by sampling the waveform shown in FIG. 12 at time intervals of ΔT. Input digital data shown in FIG. 8 are (n+1)-bit binaries obtained by converting the analog data sampled at time intervals of ΔT in FIG. 13. Conventionally, digital integrating circuits are provided for each of the sections I, II and III and used by switching. In FIG. 11, the digital integrating circuits are not reset after the accumulation of a waveform 1. Accumulation is continued for waveforms 1 to 5 and the digital integrating circuits are then reset in vertical retrace line sections. The integrating circuits corresponding to the sections I, II and III are only active for their respective sections I, II and III, and reset only in the vertical retrace line sections. Therefore, immediately before the digital integrating circuits are reset in the vertical retrace line sections, the sum of the waveforms 1 to 5 for the section I, for example, is accumulated in the integrating circuit corresponding to the section I. If the sampling cycle of ΔT is shortened by raising the sampling frequency, higher-precision auto-focusing and auto-exposure can be achieved.

Since the prior art digital integrating circuit is structured as described above, higher-order adders are delayed more, and the adder corresponding to the most significant bit (MSB) is delayed by $(n+1) \times \Delta t$. In this way, after the carry output of the preceding adder becomes definite, the next adder can perform an add operation. Therefore, the larger the bit width of the adders, the more the adders are delayed, which hinders operation speed. Therefore, when accumulation is performed for each section in camcorders and the like, it is impossible with the prior art digital integrating circuit to raise the sampling frequency because of a carry propagation delay.

SUMMARY OF THE INVENTION

The present invention is intended to solve the above-described problem, and it is therefore an object of the present invention to provide a digital integrating circuit which can eliminate the effect of a carry propagation delay to increase operation speed and can obtain an accumulated value for each section at a higher sampling frequency to effect higher-precision auto-focusing and auto-exposure in camcorders and the like.

To accomplish the above-described object, according to the present invention, there is provided a digital integrating circuit device comprising:

a carry holding type adder having a plurality of full adders corresponding to the number of bits of input data and a predetermined number of holding means for temporarily holding the sum outputs and carry outputs of said full adders and inputting the held sum outputs and carry outputs to said respective full adders, which performs accumulation using the carries of the previous full adders in the previous additions;

a carry propagation type adder having a plurality of full adders for receiving the sum outputs and carry outputs held in said holding means as the results of accumulation, which performs addition by propagating carries to the following full adders;

a predetermined number of result storage means for storing the results of additions performed by the full adders of said carry propagation type adder; and a control circuit for selecting one of the predetermined number of said holding means of said carry holding type adder to perform accumulation for each section of input data which are divided into a predetermined number of sections, sequentially inputting sum outputs and carry outputs held in the predetermined number of said holding means into the add inputs of the respective full adders of said carry propagation type adder after completion of accumulation, causing the full adders of said carry propagation type adder to add the input sum outputs and carry outputs, and sequentially storing the results of additions in the predetermined number of said result storage means.

In other words, combinations of the carry holding type adders and carry propagation type adders make it possible to increase speed in such a manner that a carry propagation delay does not affect accumulation. At the same time, provision of holding means and result storage means for each section makes it possible to calculate a cumulative value for each section at a higher sampling frequency.

The above and other objects, features and advantages of the invention will become more apparent from the following description when taken in conjunction with the accompanying drawings.

BRIEF DESCRIPTION OF THE DRAWINGS

FIGS. 7A and 7B are timing charts showing the operation of the embodiment;

DESCRIPTION OF THE PREFERRED INVENTION

Figure 1A:
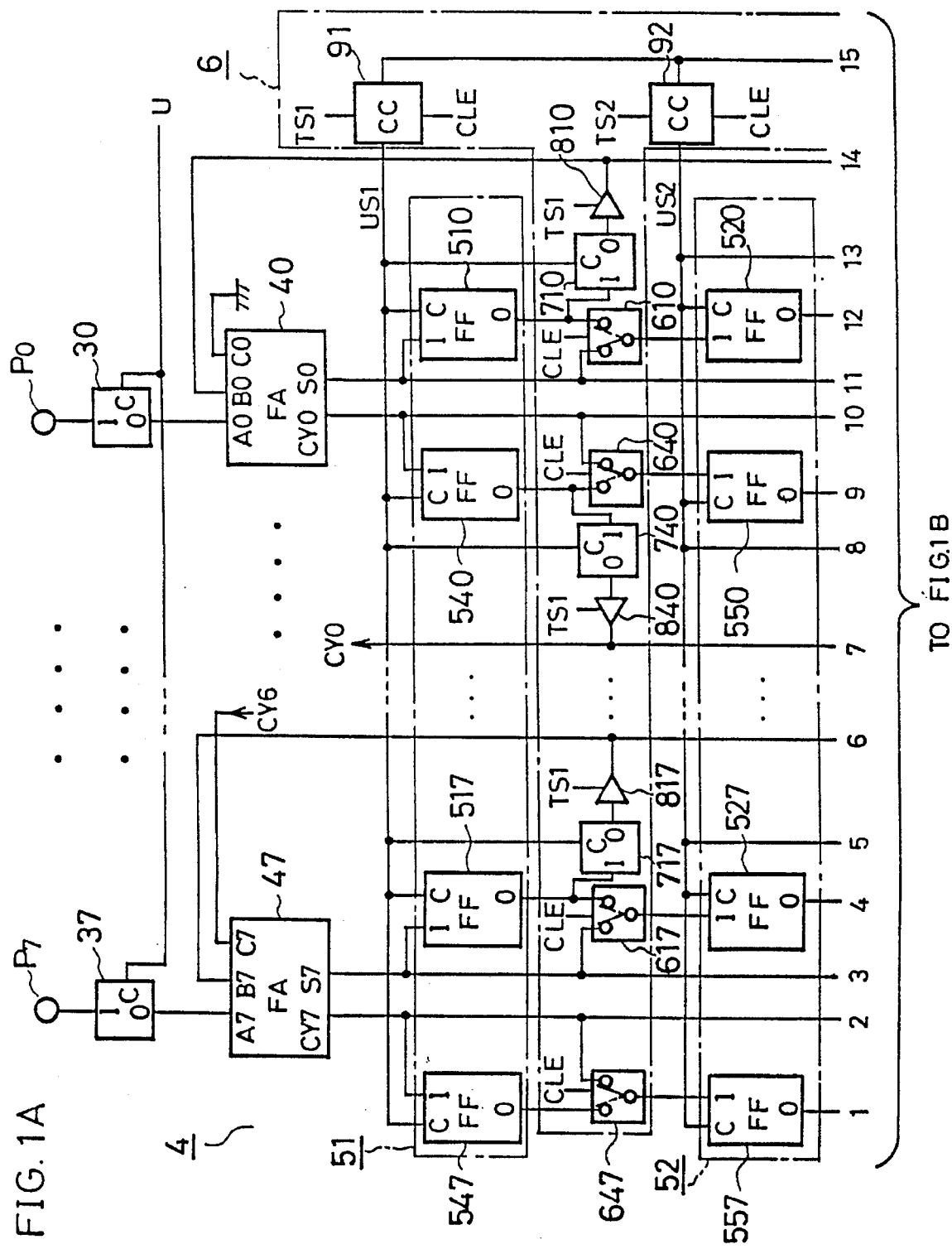
FIGS. 1A and 1B are structural diagrams of a digital integrating circuit according to an embodiment of the present invention.

Referring to the drawings, a preferred embodiment of the present invention will be described hereinunder.

Figure 10:
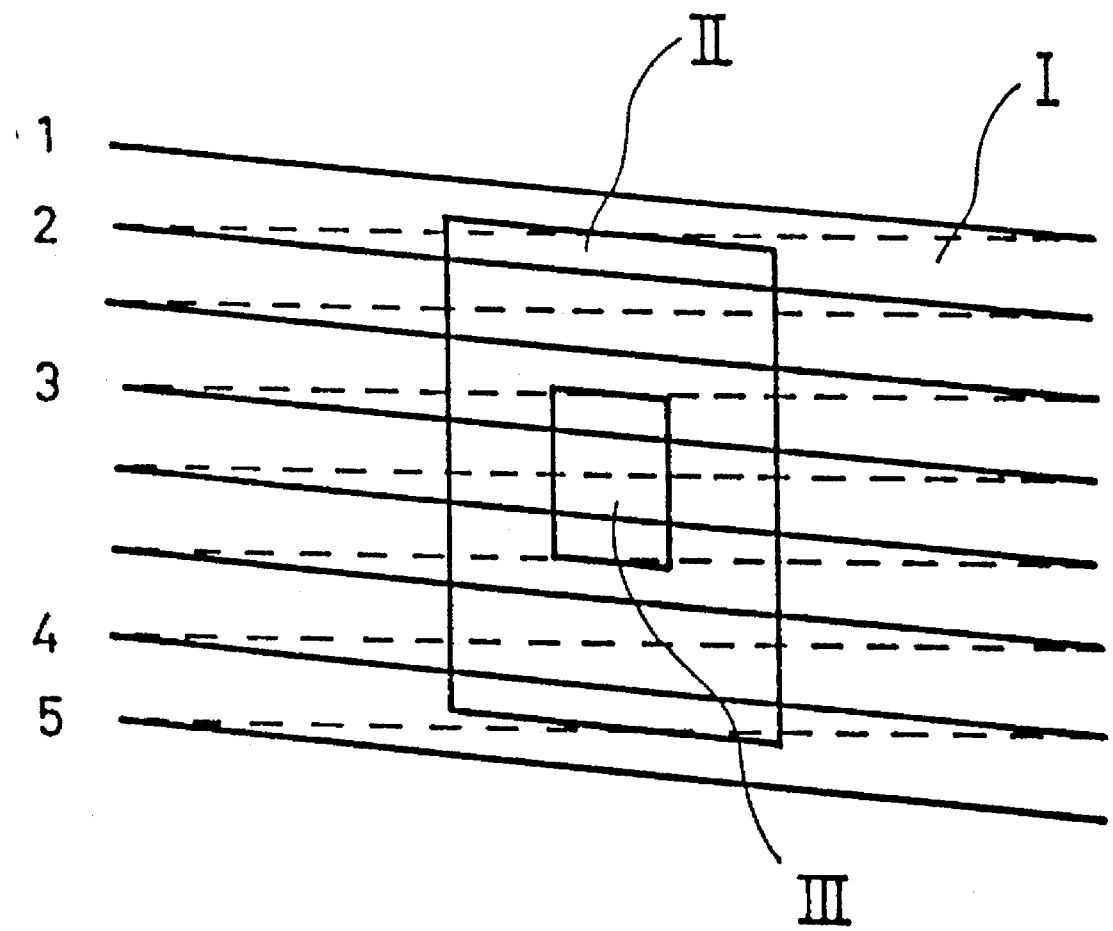
FIG. 10 is a diagram of the exemplary sections of the screen to be scanned by an image signal.
Figure 11:
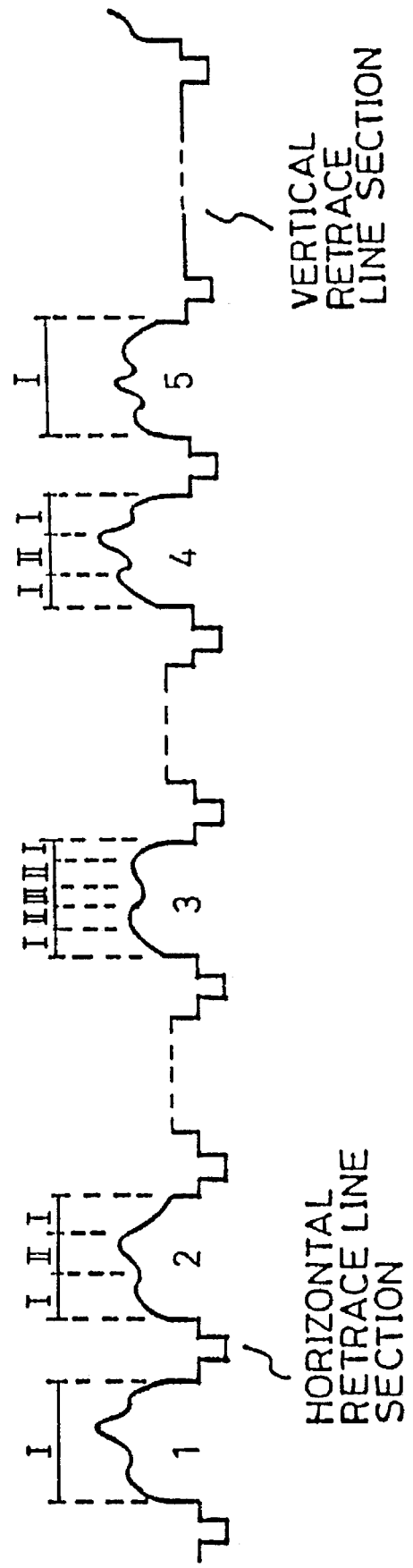
FIG. 11 is a diagram of the waveform of the image signal of FIG. 10.

As described in the foregoing, an image signal obtained when a camcorder, for example, is used to pick up an image is such as shown in FIG. 10 and FIG. 11. FIG. 10 shows scanning and FIG. 11 shows an actual waveform. The solid lines of FIG. 10 represent scanning lines and the broken lines represent horizontal retrace lines. As shown in FIG. 11, the image signal is output during scanning. There is a vertical retrace line section at the end of a field to define each field.

A digital integrating circuit device according to a preferred embodiment of the present invention comprises:

a carry holding type adder having n+1 (n: an integer of 1 or more) full adders corresponding to bits 0 to n of input data and m (m: an integer of 2 or more) holding registers for temporarily holding the sum outputs and carry outputs of said full adders and inputting the held sum outputs and carry outputs to said respective full adders, which performs accumulation using the carries of the previous full adders in the previous additions;

a carry propagation type adder having n+1 full adders for receiving the sum outputs and carry outputs held in said holding registers as the results of accumulation, which performs addition by propagating carries to the following full adders;

m result storage registers for storing the results of additions performed by the lull adders of said carry propagation type adder; and a control circuit for selecting one of the m holding registers of the carry holding type adder to perform accumulation for each section of input data which are divided into m sections, sequentially inputting sum outputs and carry outputs held in the m holding registers into the add inputs of the respective full adders of the carry propagation type adder by interconnecting the m holding registers corresponding to each bit to form shift registers, after completion of accumulation, causing the full adders of the carry propagation type adder to add the input sum outputs and carry outputs, and sequentially storing the results of additions in the m result storage registers.

Figure 1B:
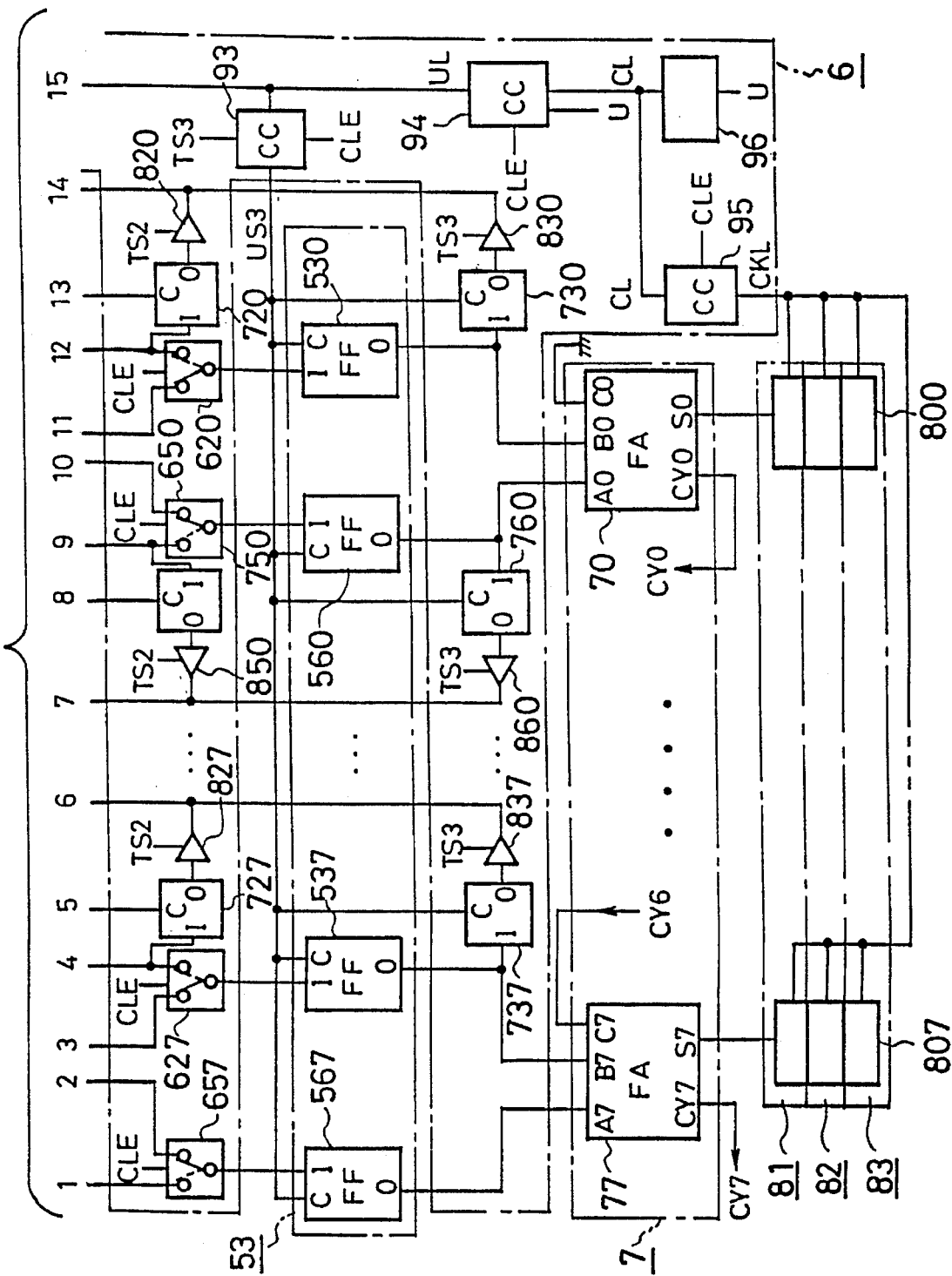
Figure 12:
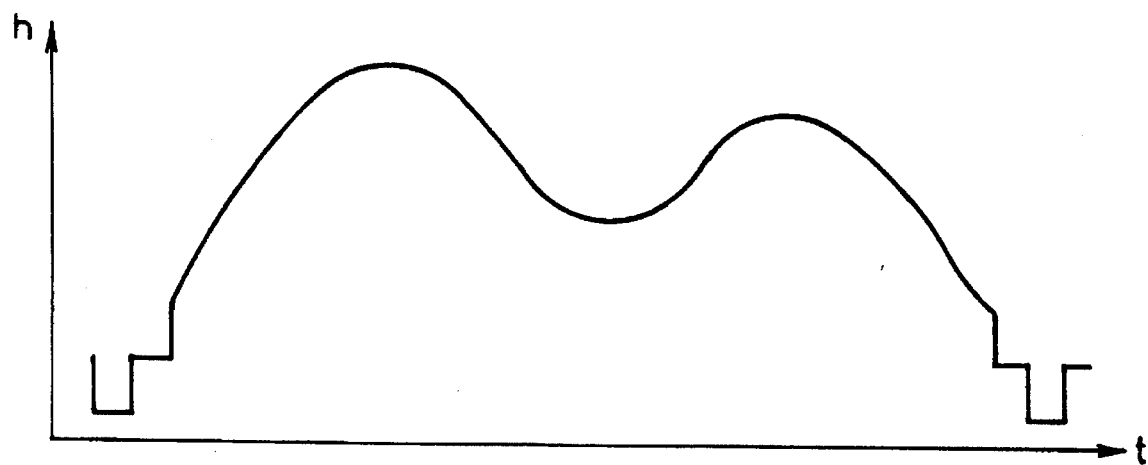
FIG. 12 is an enlarged diagram of a portion of the waveform of the image signal of FIG. 11.
Figure 13:
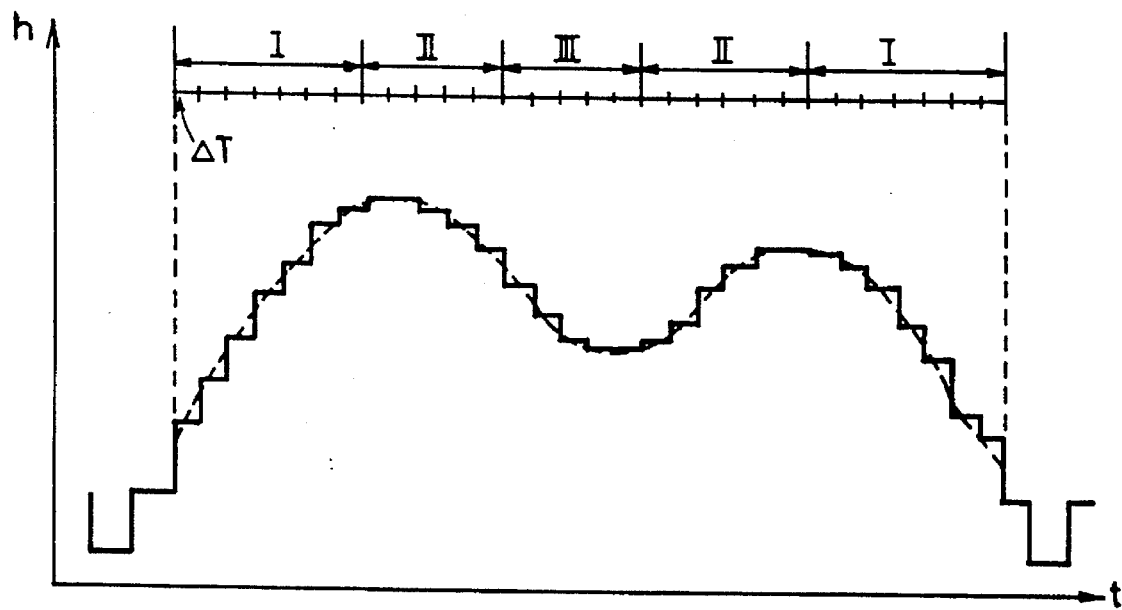
FIG. 13 is a diagram of actual integration in FIG. 12.

FIGS. 1A and 1B show the configuration of an entire digital integrating circuit according to an embodiment of the present invention. As an example, a digital integrating circuit for integrating 8-bit data (bits 0 to 7) will be described hereinunder. Only circuits corresponding to bit 0 and bit 7 are shown on account of limited space, but the digital integrating circuit will be described on the condition that there are circuits corresponding to bits 1 to 6 between them. In FIGS. 1A and 1B, U represents a reference clock signal input from a clock signal generation circuit outside the device. For instance, supposing that digital integration is performed on an image signal shown in FIG. 2, the reference clock signal is equivalent to a sampling frequency (whose cycle is ΔT) for digital integration, and a clock signal having a shorter cycle than the conventional clock signal U can be used. That is, values obtained at time intervals of ΔT are the averages of data (corresponding to the waveform shown in FIG. 12) before the interval ΔT sampling occurred. Therefore, the shorter the time interval ΔT, the closer to data values (FIG. 12) before sampling the averages become. In other words, precision is enhanced from the viewpoint of engineering. Reference numerals 30 to 37 represent latch circuits which allow the input values (values converted into digital values at a sampling cycle of ΔT and equivalent to the step-formed solid lines of FIG. 2) of the external input terminals P0 to P7 to pass when the above-described reference clock signal is at "H" and retain the previous state when the reference clock signal is at "L". The outputs of the latch circuits are input into the add inputs A0 to A7 of the eight full adders 40 to 47 corresponding to bits 0 to 7 of the input data. These full adders are different from the conventional full adders 10 to 1n in that carry outputs CY0 to CY6 from lower-order full adders are not directly connected to the input terminals of the carry inputs C1 to C7 of higher-order full adders. They are connected to the input terminals through D type flip-flops 540 to 546 (unshown), 550 to 556 (unshown), and 560 to 566 (unshown), latch circuits 740 to 746 (unshown), 750 to 756 (unshown) and 760 to 766 (unshown), tri-state buffer circuits 840 to 846 (unshown), 850 to 856 (unshown) and 860 to 866 (unshown), and the like, all of which will be described hereinafter. Reference numerals 510 to 517, 520 to 527 and 530 to 537 represent D type flip-flops for temporarily storing the sum outputs S0 to S7 of the full adders 40 to 47, and 540 to 547, 550 to 557 and 560 to 567 represent D type flip-flops for temporarily holding the carry outputs CY0 to CY7 of the full adders 40 to 47. All of the D type flip-flops are controlled by respective control clock signals US1 to US3 which will be described hereinafter. Three holding registers (holding means) 51 to 53 are constructed by the D type flip-flops 510 to 517 and 540 to 547, 520 to 527 and 550 to 557, and 530 to 537 and 560 to 567, respectively. Moreover, a carry holding type adder 4 for performing accumulation using the carry of the previous full-adder in the previous addition is constituted by the above-described full adders 40 to 47 and holding registers 51 to 53.

Figure 2:
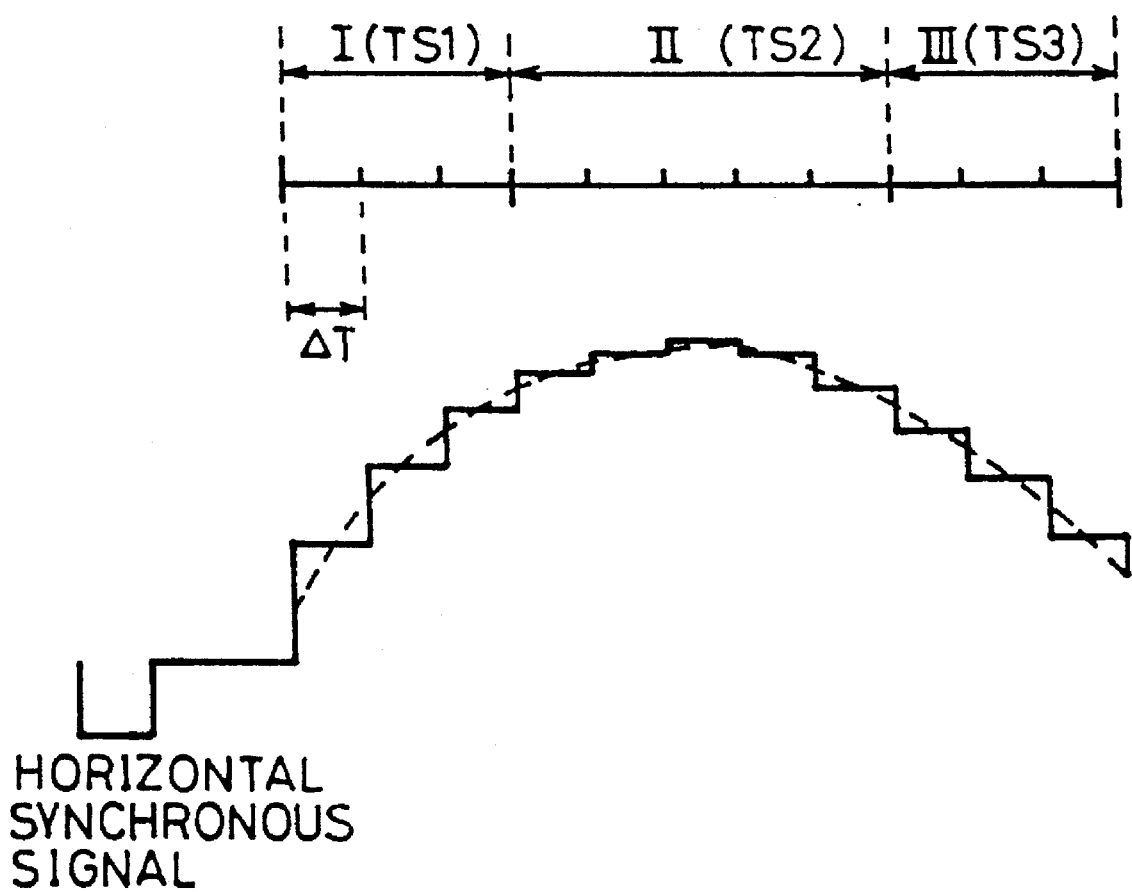
FIG. 2 is a diagram of an example of the waveform of the image signal of the embodiment.
Figure 3:
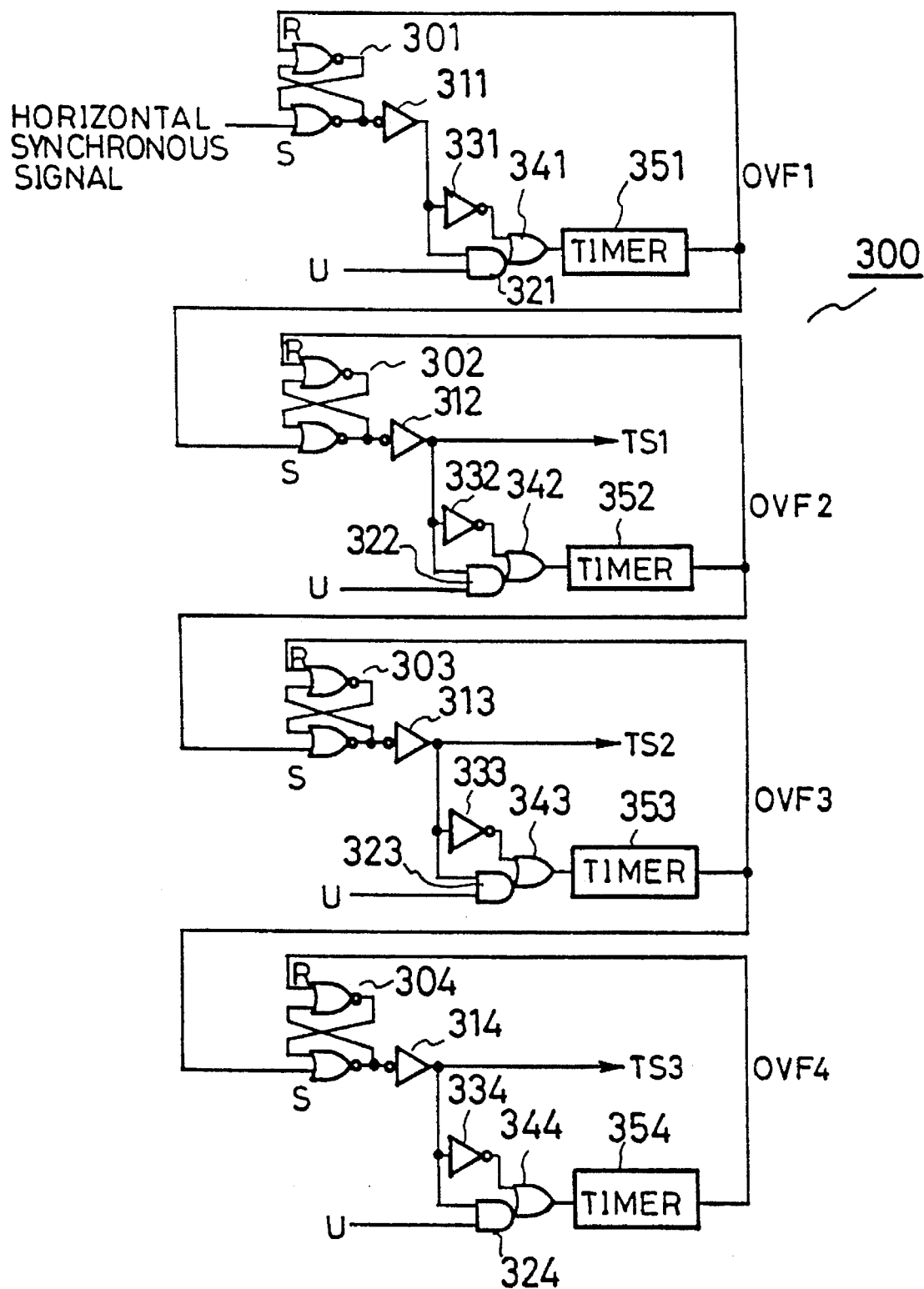
FIG. 3 is a diagram of the control signal generation circuit of the embodiment.

A reference numeral 6 represents a control circuit. Denoted at 610 to 617, 620 to 627, 640 to 647 and 650 to 657 are selection switch circuits for selecting data to be input into the flip-flops 520 to 527 and 550 to 557 in the second stage from the top of FIG. 1, and 530 to 537 and 560 to 567 in the third stage, respectively. The selection switch circuits select the sum outputs S0 to S7 and carry outputs CY0 to CY7 of the full adders 40 to 47 by means of the switch contacts, as shown by solid lines, when a clear signal CLE from the outside of the device is at "L", and the data outputs O of the flip-flops 510 to 517, 540 to 547, 520 to 527 and 550 to 557 in the upper stage by means of the switch contacts, as shown by broken lines, when the signal is at "L". The clear signal CLE remains at "L" during the accumulation of data (horizontal scanning), and turns to "H" upon completion of the accumulation (vertical retrace line section). Denoted at 710 to 717, 720 to 727, 730 to 737, 740 to 746 (unshown, none corresponding to bit 7), 750 to 756 (unshown, none corresponding to bit 7) and 760 to 766 (unshown, none corresponding to bit 7) are latch circuits which pass the values of the data output O of the flip-flops in the upper stage to be supplied to the data input terminals I thereof when the control clock signals US1 to US3 to be supplied to the clock signal input terminal C thereof are at "H" and retain the previous state when the control clock signals are at "L". Designated at 810 to 817, 820 to 827, 830 to 837, 840 to 846, 850 to 856 and 860 to 866 are tri-state buffer circuits whose inputs are connected to the data output O of the respective latch circuits 710 to 717, 720 to 727, 730 to 737, 740 to 746, 750 to 756 and 760 to 766 and whose outputs are connected to the other respective add inputs B0 to B7 of the full adders 40 to 47 and the respective carry inputs C1 to C7 of the higher-order full adders. The tri-state buffer circuits enable output when the control signals TS1 to TS3 are at "H", and a high impedance occurs when the signals are at "L". The control signals TS1 to TS2 indicate each section for accumulation and are such as shown in FIG. 2 (control of each section will be described hereinafter). As shown in FIG. 3, the control signals TS1 to TS3 are generated by a timer which uses the aforementioned reference clock signal U as an event clock signal.

In FIG. 3, reference numerals 301 to 304 represent RS flip-flops consisting of NOR gates. A horizontal synchronous signal from a camcorder and the like is input into the set terminal S of the RS flip-flop 301 in the first stage. Denoted at 311 to 314 are inverters connected to the outputs of the above-described RS flip-flops. The outputs of the inverters 312 to 314 in the second stage and after are the control signals TS1 to TS3, respectively. Reference numerals 321 to 324 represent AND gates which receive the outputs of the above-described inverters 311 to 314 and the reference clock signal U, 331 to 334 inverters which invert the outputs of the inverters 311 to 314, 341 to 344 OR gates which receive the outputs of the inverters 331 to 334 and the outputs of the AND gates 321 to 324, and 351 to 354 timers to which different values Are set. The first timer 351 is set for the period until the horizontal synchronous signal turns to an image signal in FIG. 2, and the timers 352 to 354 are set at periods I, II and III in FIG. 2, respectively, and counted by the reference clock signal U input through the AND gates 321 to 324 and the OR gates 341 to 344 based on the outputs of the above-described inverters 311 to 314. In other words, the reference clock signal U is supplied to the timers 351 to 354 when the outputs of the inverters 311 to 314 are "H", whereas the clock inputs of the timers 351 to 354 are fixed at "H" when the outputs of the inverters 311 to 314 are "L" so that the timers cannot undertake a count operation. The overflow signals OVF1 to OVF4 of the timers 351 to 354 are input into the reset terminal R of the respective RS flip-flops 301 to 304 and the overflow signals OVF1 to OVF3 of the timers 351 to 354 are input into the set terminal S of the following RS flip-flops 302 to 304 at the same time. That is, the overflow signal OVF1 of the timer 351 is equivalent to a start signal for the control signal TS1, the overflow signal OVF2 of the timer 352 to an end signal for the control signal TS1 and a start signal for the control signal TS2, the overflow signal OVF3 of the timer 353 to an end signal for the control signal TS2 and a start signal for the control signal TS3, and the overflow signal OVF4 of the timer 354 to an end signal for the control signal TS3. The control signal generation circuit 300 of FIG. 3 is for obtaining the image signal shown in FIG. 2. In the case of the image signal shown in FIG. 10 and FIG. 11, since it is necessary to count a maximum of five sections like the scanning line (3), two timers for generating control signals TS2 and TS1 for the latter sections II and I need to be added to the control signal generation circuit 300 shown in FIG. 3 and the logical sum of similar control signals is taken to generate final control signals TS1 and TS2. Sections are different for each scanning line, but as this is known in advance, a value set in each timer is changed for each scanning line by decoding a scanning line number.

Figure 4:
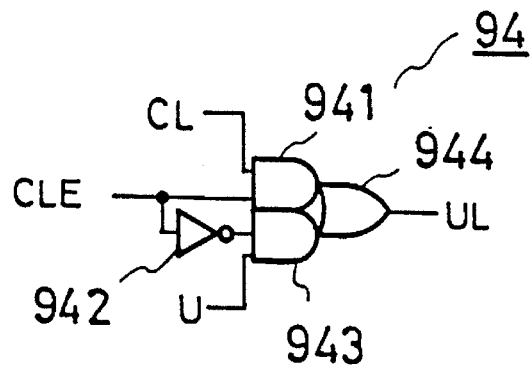
FIG. 4 is a diagram of the clock control circuit of the embodiment.

In FIGS. 1A and 1B, reference numerals 91 to 95 represent clock control circuits (CC), and 96 a dividing circuit for dividing the reference clock signal U by two because carry propagation type addition to be described hereinafter requires a slow clock signal like the prior art. As shown in FIG. 4, the clock control circuit 94 consists of an AND gate 941 for receiving a divided clock signal CL obtained by dividing the reference clock signal U by two with the above-described dividing circuit 96 and the aforementioned clear signal CLE, an inverter 942 for inverting the clear signal CLE, an AND gate 943 for receiving the output of the inverter 942 and the reference clock signal U, and an OR gate 944 for receiving the outputs of the above-described AND gates 941 and 943 and outputting a composite clock signal UL. In other words, this clock control circuit 94 selects the reference clock signal U or the divided clock signal CL based on the clear signal CLE and outputs the composite clock signal UL to the clock control circuits 91 to 93. When the clear signal CLE is at "L", the composite clock signal UL is the reference clock signal U, whereas, when the clear signal CLE is at "H", the composite clock signal UL is the divided clock signal CL.

Figure 5:
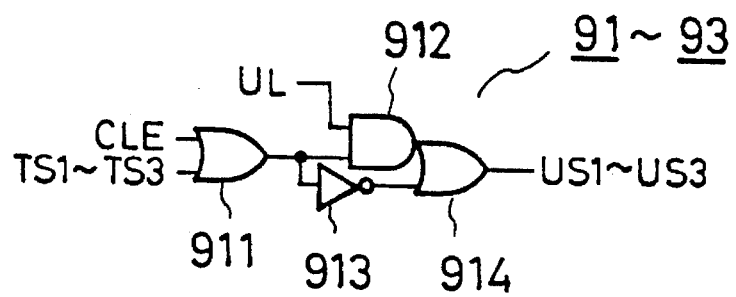
FIG. 5 is a diagram of the clock control circuit of the embodiment.

The clock control circuits 91 to 93 are of the same type, and, as shown in FIG. 5, each consists of an OR gate 911 for receiving the clear signal CLE and the above-described control signals TS1 to TS3, an AND gate 912 for receiving the output of this OR gate 911 and the composite clock signal UL, an inverter 913 for inverting the output of the OR gate 911, and an OR gate 914 for receiving the outputs of the inverter 913 and the AND gate 912 and outputting the above-described control clock signals US1 to US3. In other words, the control clock signals US1 to US3 are the composite clock signal UL when the control signals TS1 to TS3 are at "H", or when the clear signal CLE is at "H", whereas the control clock signals US1 to US3 become "H" when the control signals TS1 to TS3 and the clear signal CLE are at "L".

Figure 6:
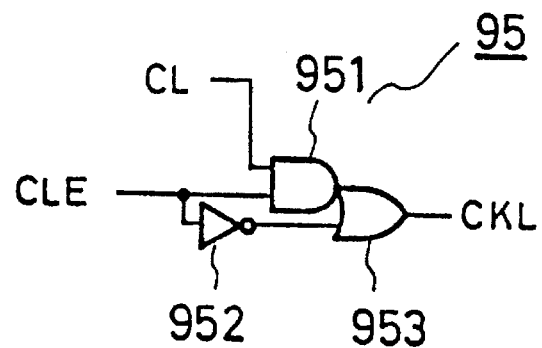
FIG. 6 is a diagram of the clock control circuit of the embodiment.

Meanwhile, the clock control circuit 95, as shown in FIG. 6, consists of an AND gate 951 for receiving the above-described divided clock signal CL and the clear signal CLE, an inverter 952 for inverting the clear signal CLE and an OR gate 953 for receiving the outputs of the inverter 952 and the AND gate 951 and outputting the shift clock signal CKL to a shift register which will be described hereinafter. In other words, the shift clock signal CKL is the divided clock signal CL when the clear signal CLE is at "H", whereas the shift clock signal CKL becomes "H" when the clear signal CLE is at "L".

The control circuit 6 is structured such as described above.

In FIGS. 1A and 1B, reference numerals 70 to 77 represent eight full adders having add inputs A0 to A7 for receiving carry outputs stored in the above-described storage registers 51 to 53 as the results of accumulation and the other add inputs B0 to B7 for receiving sum outputs. These full adders 70 to 77 are the same as the full adders 10 to 1n of the prior art except that add inputs A0 to A7 and B0 to B7 are obtained from carry outputs and sum outputs as the results of accumulation by the above-described carry holding type adder 4. In other words, in these full adders 70 to 77, lower-order carry outputs CY0 to CY6 are directly connected to the respective higher-order carry inputs C1 to C7, and these elements constitute a carry propagation type adder 7 for performing an add operation by propagating a carry to the following full adder. Reference numerals 800 to 807 represent 3-bit shift registers which receive the sum outputs S0 to S7 of the full adders 70 to 77 and are controlled by a shift clock signal CKL from the aforementioned clock control circuit 95 to be sequentially shifted. Three result storage registers (result storage means) 81 to 83 are provided in each of the shift registers 800 to 807 to store the results of addition by the full adders 70 to 77 of the above-described carry propagation type adder 7 according to bits corresponding to the shift registers 800 to 807.

A description is subsequently given of the operation of the digital integrating circuit.

Figure 7B:
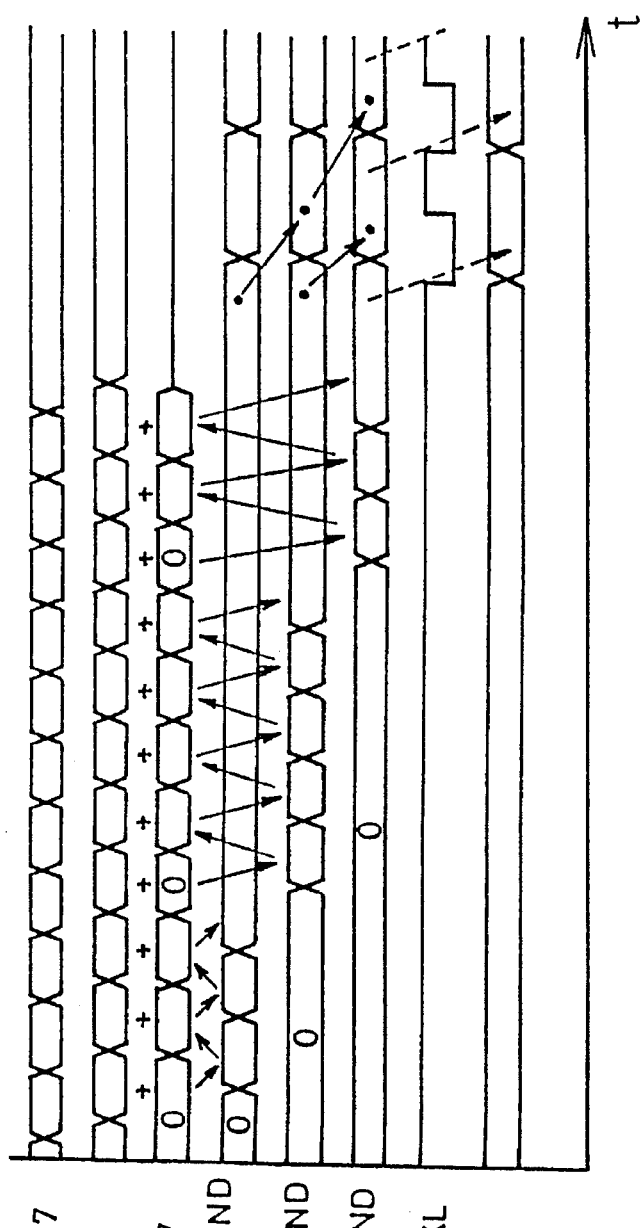
Figure 8:
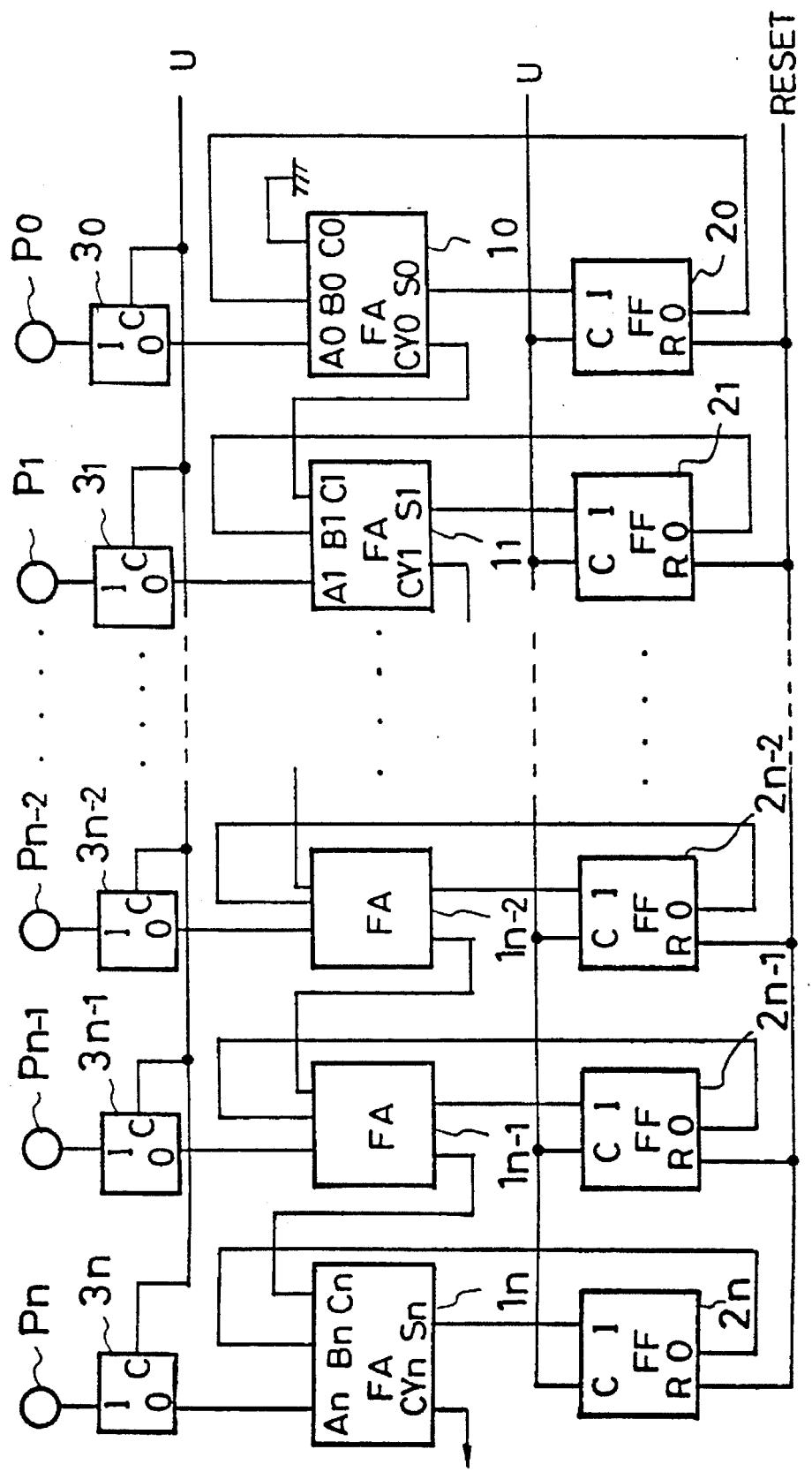
FIG. 8 is a structural diagram of a prior art digital integrating circuit.
Figure 9:
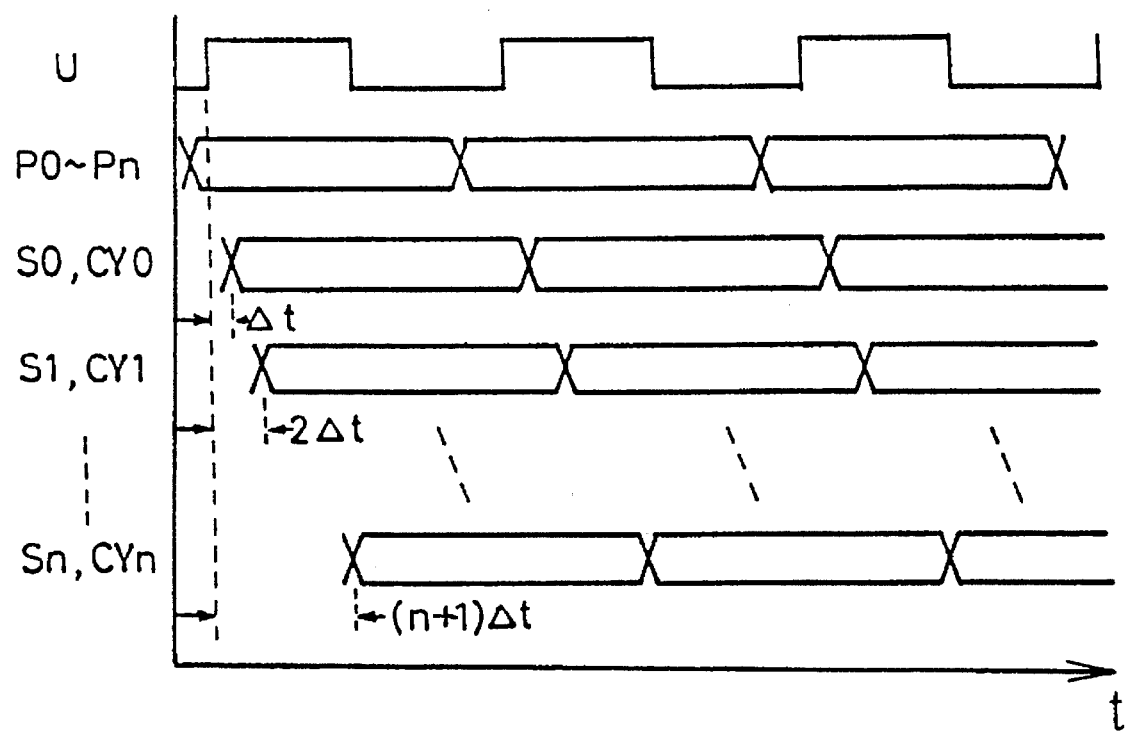
FIG. 9 is a timing chart showing the operation of the prior art.

FIGS. 7A and 7B show timing charts of this embodiment of the present invention. Input values of the external input terminals P0 to P7 are input into the add inputs A0 to A7 of the full adders 40 to 47 by the latch circuits 30 to 37 upon a rise in the reference clock signal U. Meanwhile, the selection switch circuits 610 to 617, 620 to 627, 640 to 647 and 650 to 657 are connected to the sum outputs S0 to S7 and the carry outputs CY0 to CY7 of the full adders 40 to 47, as shown by solid lines, since the clear signal CLE is at "L". The D type flip-flops 510 to 517, 520 to 527, 530 to 537, 540 to 547, 550 to 557 and 560 to 567 are set at an initial value of "0". When the control signal TS1 becomes "H", an initial value of "0" is input into the other add inputs B0 to B7 of the full adders 40 to 47, and the sum outputs S0 to S7 (same as the input value) and the carry outputs CY0 to CY7 ("0") of the full adders 40 to 47 as the results of additions are latched by the flip-flops 510 to 517 and 540 to 547 (holding register 51) in the first stage because only the control clock signal US1 operates. Furthermore, since the tri-state buffer circuits 810 to 817 and 840 to 846 are enabled to output data, the outputs of the above-described flip-flops 510 to 517 and 540 to 546 are input into the other add inputs B0 to B7 of the full adders 40 to 47 and the carry inputs C1 to C7 of the full adders 41 to 47 through the latch circuits 710 to 717 and 740 to 746 upon a rise in the control clock signal US1. At this time, since the control clock signal US1 and the reference clock signal U are synchronous with each other, the next input data are input into the add inputs A0 to A7 of the full adders 40 to 47 through the external input terminals P0 to P7 and the latch circuits 30 to 37. The sum outputs S0 to S7 and the carry outputs CY0 to CY7 of the full adders 40 to 47 are also supplied to the data inputs I of the flip-flops in the second and third stages through the selection switch circuits 610 to 617, 620 to 627, 640 to 647 and 650 to 657. However, as described in the foregoing, since the control signal TS1 is at "H" and only the control clock signal US1 operates, only the flip-flops in the first stage operate and those in the second and third stages do not operate. When the control signal TS1 becomes "L" after a repetition of this process, accumulated values during this period are stored in the flip-flops 510 to 517 and 540 to 547 (storage register 51) in the first stage. When the control signals TS2 and TS3 become "H", the same process is undertaken, and when the control signal TS3 becomes "L" finally, an accumulated value for the section I (TS1) of FIG. 2 is stored in the flip-flops 510 to 517 and 540 to 547 (holding register 51) in the first stage, an accumulated value for the section II (TS2) in the flip-flops 520 to 527 and 550 to 557 (holding register 52) in the second stage, and an accumulated value for the section III (TS3) in the flip-flops 530 to 537 an 560 to 567 (holding register 53) in the third stage. These processes are performed by the carry holding type adder from the viewpoint of the sections I (TS1), II (TS2) and III (TS3). Since accumulation is performed using the carry of the previous full adder in the previous addition, a delay in carry propagation does not occur. In other words, the present carry output from the lower-order full adder is not awaited, but a carry output in the previous addition stored in the flip-flop is used, whereby a delay in carry propagation does not occur. To explain this in more detail, the carry of the previous full adder which has become definite with the previous clock signal is used so that two add inputs and a carry input become definite upon a rise in the clock signal U and the results of addition become definite immediately. In the prior art, as shown in FIG. 9, the results of addition do not become definite unless the carry of the previous full adder becomes definite. Therefore, completion of (n+1)-bit addition is delayed by (n+1)Δt. Use of the carry output in the previous addition does not cause a problem because the final add operation is performed by carry propagation type addition which will be described hereinafter.

After completion of accumulations for all the sections, that is, a vertical retrace line section is reached after a repetition of the above process, the clear signal CLE becomes "H", and the divided clock signal CL is thereby output as the control clock signals US1 to US3 and the shift clock signal CKL. When the clear signal CLE becomes "H", the selection switch circuits 610 to 617, 620 to 627, 640 to 647 and 650 to 657 are switched, as shown by dotted lines, so that the flip-flops 510 to 517, 520 to 527, 530 to 537, 540 to 547, 550 to 557 and 560 to 567 are connected vertically to form a shift register. Then, data are input into the full adders 70 to 77 sequentially in response to the control clock signals US1 to US3 (divided clock signal CL), and final accumulated values for the sections I (TS1), II (TS2) and III (TS3) are input into the shift registers 800 to 807 in response to the shift clock signal CKL (divided clock signal CL). In other words, when input into the full adder 70 is taken as an example, since the switch contacts of the selection switch circuits 610 and 620 are such as shown by dotted lines, the flip-flops 510, 520 and 530 in three stages are interconnected in series. The control clock signals US1, US2 and US3 to be input into the flip-flops 510, 520 and 530 have the same phase. These flip-flops constitute a shift register in themselves, by which data is input into the add input B0 of the full adder 70 in response to the control clock signals US1, US2 and US3. Similarly, since the switch contacts of the selection switch circuits 640 and 650 are such as shown by dotted lines, the flip-flops 540, 550 and 560 constitute a shift register, by which data is input into the other add input A0 of the full adder 70. In this case, the shift register 800 is also constructed by three flip-flops which are interconnected in series and whose input clock signals are the shift clock signal CKL having the same phase as US1, US2 and US3. Data output from the sum output S0 of the full adder 70 in response to the shift clock signal CKL is transferred through the shift register 800. At this time, since the full adders 70 to 77 operate as the carry propagation type adder 7, a delay in carry propagation occurs, but it does not affect the aforementioned cumulative addition. A delay in carry propagation is allowed by setting a lower frequency than that of the reference clock signal U using the divided clock signal CL. In this way, high-speed cumulative addition can be performed for each section.

In the above-described embodiment, there are three sections I (TS1) to III (TS3), but there may be two or more than three. As described in the foregoing, sections may appear repeatedly. However, in this case, a control signal TSm needs to be generated by expanding the circuit of FIG. 3, if necessary. Furthermore, in the above embodiment, input data consists of 8 bits (bits 0 to 7), but the present invention can be practised by providing the number of circuits corresponding to bits 0 to n of (n+1)-bit input data.

As described on the foregoing pages, according to the present invention, there is provided a digital integrating circuit which can increase the speed of accumulation by preventing a delay in carry propagation from affecting accumulation and can calculate an accumulated value for each section at a higher sampling frequency as a carry holding type adder and a carry propagation type adder are combined, their holding means and result storage means are provided for each section, and a single holding means can be selected for each section.

What is claimed is:

1. A digital integrating circuit device comprising:

a carry holding type adder having a plurality of full adders corresponding to the number of bits of input data and a predetermined number of holding means for temporarily holding the sum outputs and carry outputs of said full adders and inputting the held sum outputs and carry outputs to said respective full adders, which performs accumulation using the carries of the previous full adders in the previous additions;

a carry propagation type adder having a plurality of full adders for receiving the sum outputs and carry outputs held in said holding means as the results of accumulation, which performs addition by propagating carries to the following full adders;

a predetermined number of result storage means for storing the results of additions performed by the full adders of said carry propagation type adder; and a control circuit for selecting one of the predetermined number of said holding means of said carry holding type adder to perform accumulation for each section of input data which are divided into a predetermined number of sections, sequentially inputting sum outputs and carry outputs held in the predetermined number of said holding means into the add inputs of the respective full adders of said carry propagation type adder after completion of accumulation, causing the full adders of said carry propagation type adder to add the input sum outputs and carry outputs, and sequentially storing the results of additions in the predetermined number of said result storage means.

2. The digital integrating circuit device according to claim 1 wherein each bit value of the input data is input into an add input of each of the full adders of said carry holding type adder through a latch circuit whereas the sum output of each of the full adders temporarily stored in said holding means is input into the other add input of each of the full adders; the carry input of the first full adder corresponding to the least significant bit of the input data is fixed at "0"; and the carry outputs of the previous full adders temporarily stored in said holding means are input into the carry inputs of other full adders.

3. The digital integrating circuit device according to claim 1 wherein a pair of flip-flops for temporarily storing the sum output and carry output of each of the full adders of said carry holding type adder are provided for each of the full adders and constitute a single holding means.

4. The digital integrating circuit device according to claim 1 wherein shift registers corresponding to a predetermined number of bits for storing the sum outputs of the full adders of said carry propagation type adder are provided for each of the full adders to constitute a predetermined number of result storage means.

5. The digital integrating circuit device according to claim 1 which is used in an imaging apparatus which needs to obtain an integral value of a luminance signal for each section of an image obtained from each scanning.

6. A digital integrating circuit device comprising:

a carry holding type adder having n+1 (n: an integer of 1 or more) full adders corresponding to bits 0 to n of input data and m (m: an integer of 2 or more) holding registers for temporarily storing the sum outputs and carry outputs of the full adders and inputting the sum outputs and carry outputs into the respective full adders, which performs accumulation using the carries of the previous full adders in the previous additions;

a carry propagation type adder having n+1 full adders for receiving the sum outputs and carry outputs held in said holding registers as the results of accumulation, which performs addition by propagating carries to the following full adders;

m result storage registers for storing the results of additions performed by the full adders of said carry propagation type adder; and a control circuit for selecting one of the m holding registers of said carry holding type adder to perform accumulation for each section of input data which is divided into m sections, sequentially inputting sum outputs and carry outputs held in the m holding registers into the add inputs of the respective full adders of said carry propagation type adder by interconnecting the m holding registers corresponding to each bit to form shift registers, after completion of accumulation, causing the full adders of said carry propagation type adder to add the input sum outputs and carry outputs, and sequentially storing the results of additions in the m result storage registers.

7. The digital integrating circuit device according to claim 6 wherein each bit value of the input data is input into an add input of each of the full adders of said carry holding type adder through a latch circuit whereas the sum output of each of the full adders temporarily stored in said holding registers is input into the other add input of each of the full adders; the carry input of the first full adder corresponding to the least significant bit of the input data is fixed at "0"; and the carry outputs of the previous full adders temporarily stored in said holding registers are input into the carry inputs of other full adders.

8. The digital integrating circuit device according to claim 6 wherein a pair of flip-flops for temporarily storing the sum output and carry output of each of the full adders of said carry holding type adder are provided for each of the full adders and constitute a single holding register.

9. The digital integrating circuit device according to claim 6 wherein shift registers corresponding to m bits for storing the sum outputs of the full adders of said carry propagation type adder are provided for each of the full adders to constitute m result storage registers.

10. The digital integrating circuit device according to claim 6 which is used in an imaging apparatus which needs to obtain an integral value of a luminance signal for each section of an image obtained from each scanning.

* * * * *